United States Patent [19]
Fletcher et al.

[11] 3,752,559
[45] Aug. 14, 1973

[54] RITCHEY-CHRETIEN TELESCOPE

[76] Inventors: James C. Fletcher, Administrator of the National Aeronautics and Space Administration with respect to an invention of; Seymour Rosin, Massapequa Park; Max Amon, Farmingdale, both of N.Y.

[22] Filed: Oct. 29, 1971

[21] Appl. No.: 193,814

[52] U.S. Cl. .................. 350/55, 350/199, 350/204, 250/203
[51] Int. Cl. .......................................... G02b 17/00
[58] Field of Search .................. 350/55, 34, 27-29, 350/199-201, 204; 250/203

[56] References Cited
UNITED STATES PATENTS

| 3,598,468 | 8/1971 | Perry | 350/55 |
| 2,672,072 | 3/1954 | Sachtleben et al. | 350/166 |

OTHER PUBLICATIONS
Rosin, Article in Applied Optics, Vol. 5, No. 4, April 1966, pgs. 675 and 676.

Primary Examiner—David H. Rubin
Attorney—R. F. Kempf, John R. Manning et al.

[57] ABSTRACT

A Ritchey-Chretien telescope responsive to images located off the telescope optical axis includes transparent flat plate means positioned in the ray path of the image. The flat plate means has a tilt angle relative to the ray path to compensate substantially for astigmatism introduced by the Ritchey-Chretien telescope. The tilt angle of the plate means is directly proportional to the off axis angle of the image. The plate means preferably comprises two flat plates having opposite inclination angles relative to the ray path. A detector responsive to the optical image as transmitted through the flat plate means is positioned approximately on the sagittal focus of the telescope.

10 Claims, 4 Drawing Figures

RITCHEY-CHRETIEN TELESCOPE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF INVENTION

The present invention relates generally to Ritchey-Chretien telescopes and more particularly to a Ritchey-Chretien telescope including flat plate means for correcting astigmatism introduced by the telescope for optical images located off the telescope axis.

BACKGROUND OF THE INVENTION

Ritchey-Chretien telescopes having low eccentricity, primary hyperbolic reflectors and hyperbolic secondary reflectors have been widely adopted because they eliminate coma of classical Cassegrain telescopes. In certain applications, it is desirable to use Ritchey-Chretien telescopes for optical images located off axis from the telescope axis which is defined by a common axis of the primary and secondary reflectors. For example, in certain spacecraft and possibly observatory instruments, it is desirable to observe a primary optical image which is located on the telescope axis, while simultaneously observing a secondary, off axis image. In the spacecraft application, this is particularly true if it is desirable to track an off axis star image for location determination, while a primary image of interest, on the telescope axis, is being observed for experimental purposes. In order to utilize areas of the celestial sphere having a low density of stars suitable for tracking and position location, it is desirable to have as wide a field of view as possible for the off axis images viewed or sighted by the Ritchey-Chretien telescope.

A problem, however, of utilizing the conventional Ritchey-Chretien telescope for off axis optical images concerns the astigmatism of the off axis field. The astigmatism increases as the off axis angle of the field increases so that blurs of increasing area occur for larger off axis angles. Large blurs, of course, cannot be tolerated for spacecraft tracking or observatory sightings.

In the prior art, the off axis astigmatism of Ritchey-Chretien telescopes has been corrected by utilizing field corrector refracting elements located in a region forward of the telescope focal plane. In systems of this type, large refracting elements correct the entire field of view all at once, with resulting problems relative to size, cost and criticality of positioning the refracting elements in three dimensions. Another problem in utilizing refracting elements in telescopes for simultaneously sighting on and off axis images concerns the size of a hole that must be provided in the center of the correctors to enable the on-axis image to reach a detector therefor. This hole causes severe vignetting (shading at the image edges) of the off axis image and therefore should be avoided.

BRIEF DESCRIPTION OF THE INVENTION

In accordance with the present invention, a Ritchey-Chretien telescope is modified to substantially eliminate astigmatism introduced thereby for off axis images by employing transparent flat plate means positioned in the ray path between the off axis image and a detector. The tilt angle of the flat plate means relative to the ray path is such as to compensate substantially for the astigmatism introduced by the telescope reflectors for the off axis image. The flat plate is relatively small and is moved relative to the telescope optical axis so that it remains in the field of view of the particular off axis image being sighted. The inclined flat plate means provides substantial central astigmatism that compensates for the astigmatism of the Ritchey-Chretien telescope. It has been found that substantial compensation for the Ritchey-Chretien telescope astigmatism can be obtained with the flat plate by adjusting the plate inclination angle relative to the ray path so that it is substantially directly proportional to the off axis angle of the image.

While a single flat plate can correct for the telescope astigmatism, such a plate introduces lateral aberrations (displacement of line of sight, coma, lateral color, and distortion that have a tendency to degrade the off axis image being sighted. The lateral aberrations can be corrected by splitting the plate means into two flat, transparent segments, having opposite angles relative to the ray path. If the two segments have an identical index of refraction and thickness, they are inclined relative to the raw path by equal amounts in opposite directions. While the plate means introduces spherical aberrations and axial color into the optical image sighted at the detector, these aberrations are relatively minor and do not materially affect the sighted image.

In accordance with a further feature of the invention, the detector is located in a flat plane. The flat plane is inclined relative to the beam axis along a straight line that approximates the sagittal foci of the Ritchey-Chretien telescope. The position of the detector is adjusted so that it moves along this line as a function of the off axis angle of the image being sighted. Movement of the image detector along a straight line is performed in a relatively uncomplicated and straightforward manner compared to movement which would be along the true, sagittal foci, which is curved.

It is, accordingly, an object of the present invention to provide a new and improved Ritchey-Chretien telescope particularly adapted for sighting off axis images.

Another object of the invention is to provide a Ritchey-Chretien telescope wherein astigmatism of the telescope for off axis images is corrected by a relatively simple apparatus.

A further object of the invention is to provide a Ritchey-Chretien telescope for off axis images wherein the focal plane can be approximately represented as a straight line.

Another object of the invention is to provide a Ritchey-Chretien telescope employing a small, relatively inexpensive and noncritically positioned structure for correcting astigmatism introduced by the telescope for off axis images.

An additional object of the invention is to provide in a Ritchey-Chretien telescope means for correcting off axis astigmatism without introducing substantial vignetting.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWING

Figure 1:
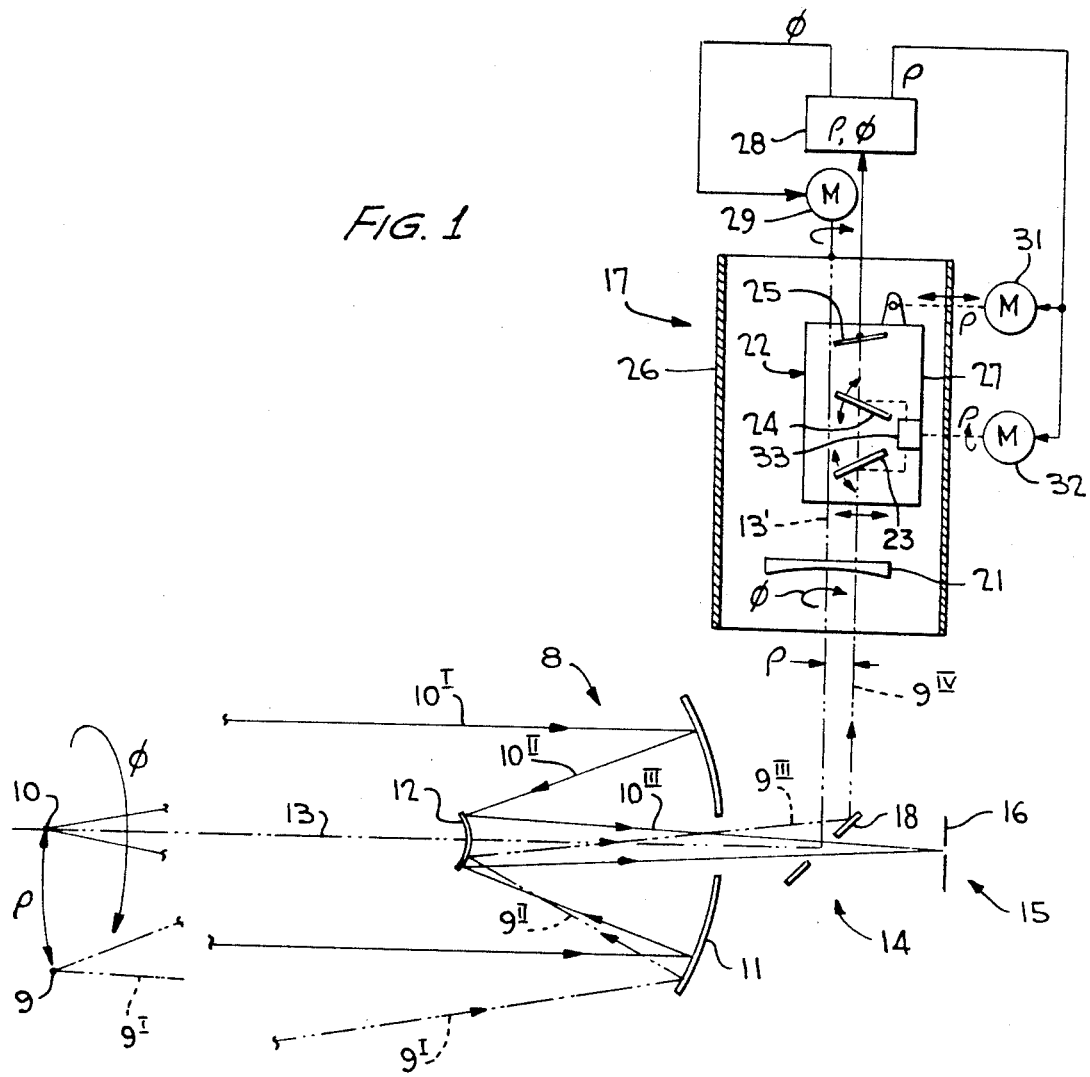
FIG. 1 is a schematic diagram of a preferred embodiment of the invention.

Reference is now made to FIG. 1 wherein a Ritchey-Chretien telescope 8 is illustrated as including a primary reflector in the form of hyperbolic mirror 11 and a secondary reflector in the form of hyperbolic mirror 12. Hyperbolic mirrors 11 and 12 have a common optical axis 13 and are formed as bodies of revolution about axis 13. As is well known, the foci of reflectors 11 and 12 are at the same point along axis 13. The eccentricity of reflector 11 deviates slightly from unity, while the eccentricity of reflector 12 is materially different from unity.

Optical energy from far field on and off axis sources 10 and 9 is reflected by mirrors 11 and 12 and coupled through a centrally located aperture of reflector 11 to an optical system 14 positioned behind mirror 11. The ray paths from sources 9 and 10 comprise rays $9^I$ and $10^I$ from the sources to primary reflector 11, rays $9^{II}$ and $10^{II}$ between reflectors 11 and 12, and rays $9^{III}$ and $10^{III}$ from secondary reflector 12 to optical system 14.

Optical system 14 is divided into two segments 15 and 17, the former responsive to optical energy from on axis source 10 and a second responsive to off axis source 9. The primary optical system 15 includes a focal plane detector 16 for monitoring source 10, the primary image of interest. Secondary optical system 17 is provided to enable an off axis image to be sighted simultaneously with the on axis image, thereby to increase the field of view of the telescope. If the telescope is mounted on a spacecraft, for example, source 10 may be a star being observed for spectral radiation, while source 9 may be a star utilized for tracking, i.e., to provide an indication of the location of a spacecraft on which the telescope is mounted. In a typical embodiment, the field of view of the secondary optical system 17 is 24 minutes of arc.

Secondary optical system 17 is at right angles to optical axis 13 and is centrally located about axis $13'$, a projection of axis 13 through the center of annular plane mirror 18. Plane mirror 18 is positioned behind reflector 11 and has its center coincident with optical axis 13 so that axis $13'$ is a continuation of optical axis 13, but in a plane at right angles to the common axis of reflectors 11 and 12. Mirror 18 is formed as an annulus to enable ray energy to be coupled through it to focal plane detector 16 for on axis source 10. Mirror 18 is tilted at an angle of 45° relative to axis 13 and is dimensioned so that off axis optical energy from source 9 is intercepted thereby to direct ray energy from the off axis source to secondary optical system 17, along a ray path indicated by $9^{IV}$.

Secondary optical system 17 includes field flattener lens 21, having a center which is coincident with axis $13'$. Lens 21 is provided to correct for field curvature introduced by the Ritchey-Chretien telescope for ray energy derived from off axis source 9.

Positioned to be responsive to light transmitted through field flattener lens 21 is flat plate means 22 which corrects for astigmatism of off axis source 9 introduced by Ritchey-Chretien telescope 8. Plate means 22 preferably comprises a pair of transparent flat glass, transparent plates 23 and 24, having the same thickness and index of refraction. The tilt angles of plates 23 and 24 relative to ray path $9^{IV}$ are equal and opposite to provide the desired astigmatic correction. The tilt angle of plate means 22 relative to the normal of ray path $9^{IV}$ is directly proportional to the angle between off axis source 9 and optical axis 13, i.e., the angle between ray $9^I$ as it impinges on reflector 11 and optical axis 13.

Light transmitted through plates 23 and 24 impinges on flat detector 25 which is positioned approximately in the sagittal, i.e., secondary, foci of telescope 8. To this end, flat or planar detector 25 is tilted relative to optical axis $13'$ at an angle approximating the sagittal foci of the telescope.

To enable secondary optical system 17 to track off axis source 9 as the off axis image rotates with two degrees of freedom relative to axis 13, the secondary optical system is rotatable about line $13'$, while flat plate means 22 and detector 25 are translatable relative to axis $13'$. To enable the secondary optical system 17 to be rotatable about axis 13, the entire secondary optical system is mounted in housing 26 having a central axis coincident with axis $13'$. The central axis of housing 26 rotates about its central axis to enable flat plate means 22 and detector 25 to be positioned at an angle, $\phi$, commensurate with the angular position of image 9 about axis 13 in a plane at right angles to the sheet of drawing.

Within housing 26 flat plate means 22 and detector 25 are mounted on plate 27 that is translated relative to optical axis $13'$ by an amount directly proportional to the field angle, $\rho$, between optical axis 13 and ray $9^I$ as the ray impinges on reflector 11. Because of the tilt angle of detector 25, movement of plate 27 transverse to optical axis $13'$ enables the detector to be located approximately in the sagittal foci of the telescope.

Rotation of housing 26 and translation of plate 27 relative to axis $13'$ can be performed manually by an operator observing the position of the secondary optical image on detector 25 or automatically. If automatic control is included, a necessity in an unmanned spacecraft, detector 25 is provided with an electronic signal transducer to provide an indication of the position of the secondary image relative to axis $13'$. In response to the position indicating signals derived by detector 25, the values of $\rho$ and $\phi$ are automatically determined by computer 28. In response to the value of $\phi$ determined by computer 28, housing 26 is rotated about axis 13 by servomechanism 29 while the value of $\rho$ determined by computer 28 causes plate 27 to translate at right angles to axis $13'$ by servomechanism 31.

The tilt angles of mirrors 23 and 24 relative to the normal of axis $13'$ and ray path $9^{IV}$ are maintained approximately directly proportional to the field angle $\rho$ to provide automatic astigmatism correction. To this end, the value of $\rho$ determined by computer 28 is fed to servomechanism 32 which drives plates 23 and 24 through differential 33 so that the plates have equal, but opposite inclination angles relative to ray path $9^{IV}$.

Figure 2:
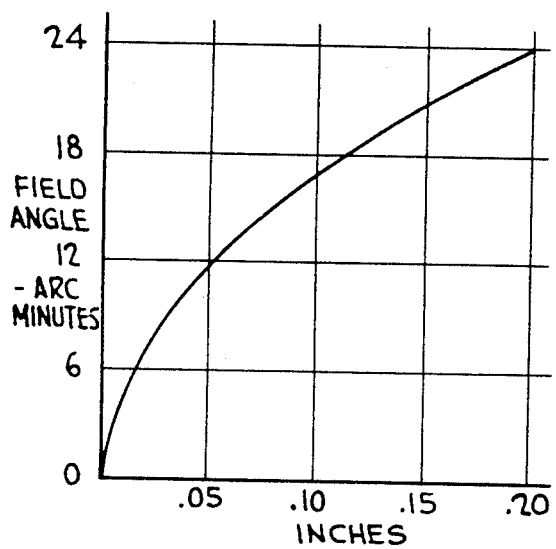
FIGS. 2 and 3 are graphs respectively showing the astigmatism of a Ritchey-Chretien telescope and flat plate means.
Figure 3:
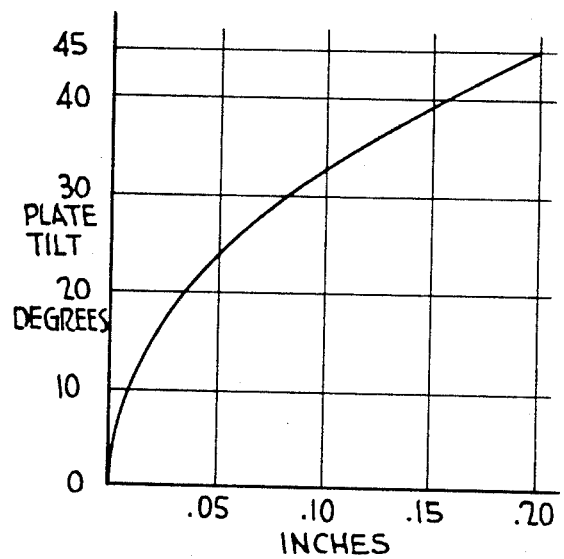

To provide an analysis of the correction introduced by the flat plate means 22 on the astigmatism of telescope 8, reference is made to FIGS. 2 and 3 of the drawing. In FIG. 2, telescope astigmatism, in inches, is plotted against the field angle, $\rho$, between image 9 and optical axis 13, in arc minutes, while in FIG. 3, the astigmatism introduced by flat plate means 22, in inches, is plotted against the tilt angle of the plates, in degrees. It can be shown that the astigmatism curve for FIG. 2 of the Ritchey-Chretien telescope is proportional to the square of the field angle and that the astigmatism of the flat plate means is approximately proportional (up to 45°) to the square of the tilt angle of the plates relative to the normal of optical axis 13'. Because the astigmatisms of telescope 8 and flat plate means 22 to off axis images are both approximately square law functions, control of the tilt angle of the plate means as a direct proportionality factor of the field angle is possible.

Figure 4:
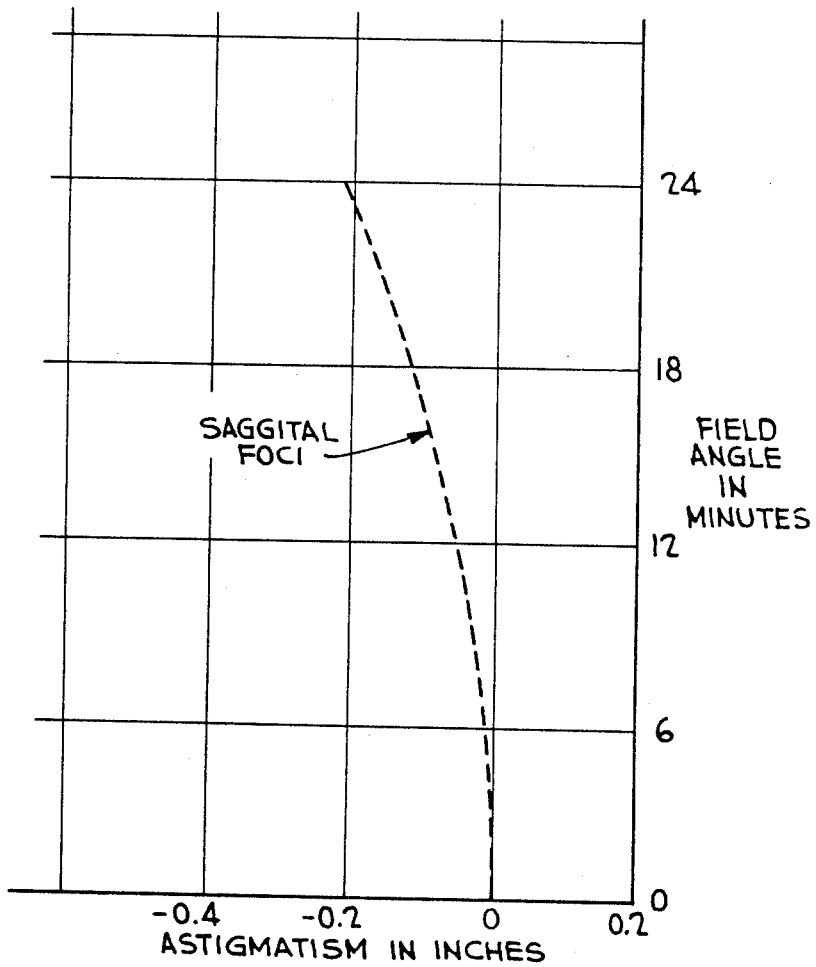
FIG. 4 is a graph showing the sagittal foci of a Ritchey-Chretien telescope employing the present invention.

Detector 25 is moved along a line that approximates the sagittal foci or curve of the Ritchey-Chretien telescope 8 because that foci is the curve along which the blur of the image from source 9 is a minimum, after the astigmatic correction of flat plate means 22 has been introduced. The exact sagittal foci of a typical Ritchey-Chretien telescope as a function of field angle, in minutes, and amount of astigmatism, in inches, is indicated in FIG. 4. It is noted that the curve of FIG. 4 has a slight curvature, and is actually a parabolic or square law function. The curvature, however, is relatively small so that the sagittal foci can be represented approximately as a straight line over a 24 minute field angle for source 9. Because of the simplicity involved in moving detector 25 along a straight line, rather than a curved surface, the detector is positioned in a straight line that approximates the best fit of the sagittal foci. As the housing 26 is rotated about axis 13, the surface of detector 25 describes a conical surface that is a best fit of the sagittal curve for telescope 8.

While the specific embodiment illustrated in FIG. 1 is directed to a system including a pair of oppositely inclined flat plates 23 and 24, it is to be understood that a single flat plate could be employed. The oppositely inclined flat plates, however, provide elimination of lateral aberrations concerned with displacement of the line of sight between source 9 and detector 25, coma, distortion, and lateral color. If the lateral aberrations are not important a single incline, glass, flat plate can replace the pair of plates illustrated.

Another alternative involves compensating for the astigmatism of Ritchey-Chretien telescope 8 by employing inclined plates of different thicknesses at different inclination angles at different points in the field of image source 9. Each of the plates has a thickness to compensate for sagittal curvature of each field angle, thereby to make the focal plane flat in space.

A further modification involves placing the secondary detector at an angle parallel to optical axis 13, rather than at right angles to the optical axis as illustrated. Placing the secondary optical system parallel to axis 13 may, however, result in mechanical problems regarding positioning of a housing for the secondary optical system.

While there has been described and illustrated one specific embodiment of the invention, it will be clear that variations in the details of the embodiment specifically illustrated and described may be made without departing from the true spirit and scope of the invention as defined in the appended claims.

We claim:

1. In a Ritchey-Chretien telescope having an optical axis and a primary optical system for detecting on-axis images, a separate secondary optical system located on a projection of said optical axis and having a field of view intercepting ray energy for off-axis images simultaneously with on-axis images, said secondary optical system including a detector for off-axis energy rays, and compensating means positioned in the off-axis energy ray path, said compensating means comprising flat transparent plate means positioned with its major surface tilted at an angle relative to said energy ray path to compensate substantially for astigmatism introduced in the off-axis images.

2. The telescope of claim 1 wherein the tilt angle of said plate means from the normal of the energy ray path is approximately directly proportional to the off axis angle of the image.

3. The telescope of claim 1 wherein the detector for off-axis energy rays is positioned approximately at the sagittal foci of the Ritchey-Chretien telescope.

4. The telescope of claim 3 wherein the detector lies in a plane having an inclination angle realtive to the axis that approximates the sagittal foci.

5. The telescope of claim 1 wherein the plate means comprises two flat, transparent plates having opposite inclination angles relative to the ray path.

6. The telescope of claim 5 wherein the plates have substantially the same index of refraction and thickness and equal but opposite inclination angles relative to the ray path.

7. The telescope of claim 6 wherein the tilt angle of each plate from the normal of the axis is approximately directly proportional to the off axis angle of the image.

8. The telescope of claim 1 further including means for positioning the detector and plate means at a position displaced from the optical axis commensurate with the off axis angle of the image.

9. The telescope of claim 1 further including means for positioning the detector and plate means at an angle about the optical axis commensurate with the angular position of the image about the axis.

10. The telescope of claim 9 further including means for positioning the detector and plate means at a position displaced from the optical axis commensurate with the off axis angle of the image.

* * * * *